United States Patent
Bian (10) Patent No.: US 10,558,102 B2
(45) Date of Patent: Feb. 11, 2020

(54) METHOD FOR FORMING LIQUID CRYSTAL DISPLAY PANEL AND LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Fengling Bian, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 219 days.

(21) Appl. No.: 15/578,332

(22) PCT Filed: Nov. 16, 2017

(86) PCT No.: PCT/CN2017/111432
§ 371 (c)(1),
(2) Date: Nov. 30, 2017

(87) PCT Pub. No.: WO2019/061737
PCT Pub. Date: Apr. 4, 2019

(65) Prior Publication Data
US 2019/0219854 A1    Jul. 18, 2019

(30) Foreign Application Priority Data

Sep. 28, 2017   (CN) .......................... 2017 1 0901828

(51) Int. Cl.
G02F 1/136 (2006.01)
G02F 1/1368 (2006.01)
(Continued)

(52) U.S. Cl.
CPC .......... *G02F 1/1368* (2013.01); *G02F 1/1362* (2013.01); *G02F 1/13394* (2013.01);
(Continued)

(58) Field of Classification Search
None
See application file for complete search history.

(56) References Cited

U.S. PATENT DOCUMENTS

2006/0268211 A1   11/2006 Chen
2015/0185550 A1*   7/2015 Han ...................... G02B 5/201
                                                                349/43
2016/0300861 A1*  10/2016 Xiao ................... H01L 27/1225

FOREIGN PATENT DOCUMENTS

CN          1580923     2/2005
CN        101114089     1/2008
(Continued)

*Primary Examiner* — Richard H Kim
(74) *Attorney, Agent, or Firm* — Hemisphere Law, PLLC; Zhigang Ma (57) ABSTRACT

A method for forming a liquid crystal display panel and a liquid crystal display panel are provided. The method includes using a mask for the patterning of the second metal layer and using the mask to pattern the common electrode on the second substrate. As a result, the common electrode includes a hollow region formed thereon. The hollow region is the same as the pattern of the second metal layer. Therefore, the capacitance between the second metal layer and the common electrode can be reduced. The problem of horizontal crosstalk is mitigated. The display quality of the liquid crystal display panel is enhanced.

10 Claims, 4 Drawing Sheets

(51) Int. Cl.
  *G02F 1/1343* (2006.01)
  *G02F 1/1333* (2006.01)
  *G02F 1/1362* (2006.01)
  *G02F 1/1339* (2006.01)
  *G02F 1/1335* (2006.01)

(52) U.S. Cl.
  CPC .... *G02F 1/13439* (2013.01); *G02F 1/133345* (2013.01); *G02F 1/133512* (2013.01); *G02F 1/136286* (2013.01); *G02F 2001/133354* (2013.01); *G02F 2001/134318* (2013.01); *G02F 2001/136231* (2013.01); *G02F 2001/136295* (2013.01); *G02F 2201/121* (2013.01)

(56) References Cited

FOREIGN PATENT DOCUMENTS

| | | |
|---|---|---|
| CN | 101625493 | 1/2010 |
| CN | 103676300 | 3/2014 |
| CN | 106873278 | 6/2017 |

* cited by examiner

```
┌─────────────────────────────────────────────────────────────┐
│ Providing a first substrate, and forming a first metal      │  S1
│ layer and a first insulating layer covering the first metal │
│ layer and the first substrate on the first substrate.       │
└─────────────────────────────────────────────────────────────┘
                              │
                              ▼                                  S2
┌─────────────────────────────────────────────────────────────┐
│ Depositing a second metal film on the first insulating      │
│ layer, and patterning the second metal film through a mask  │
│ to obtain a second metal layer.                             │
└─────────────────────────────────────────────────────────────┘
                              │
                              ▼                                  S3
┌─────────────────────────────────────────────────────────────┐
│ Depositing a second insulating layer on the second metal    │
│ layer and the first insulating layer, and forming a pixel   │
│ electrode on the second insulating layer.                   │
└─────────────────────────────────────────────────────────────┘
                              │
                              ▼
┌─────────────────────────────────────────────────────────────┐
│ Providing a second substrate, depositing a common electrode │
│ film on the second substrate, and patterning the common     │
│ electrode film through the mask of the step S2 to form a    │  S4
│ common electrode. The common electrode comprises a hollow   │
│ region formed thereon. The hollow region is the same as the │
│ pattern of the second metal layer.                          │
└─────────────────────────────────────────────────────────────┘
                              │
                              ▼                                  S5
┌─────────────────────────────────────────────────────────────┐
│ Assembling the first substrate and the second substrate     │
│ into a cell, and forming a liquid crystal layer between the │
│ first substrate and the second substrate to obtain a liquid │
│ crystal display panel.                                      │
└─────────────────────────────────────────────────────────────┘
```

FIG. 4

METHOD FOR FORMING LIQUID CRYSTAL DISPLAY PANEL AND LIQUID CRYSTAL DISPLAY PANEL

RELATED APPLICATIONS

The present application is a National Phase of International Application Number PCT/CN2017/111432, filed on Nov. 16, 2017, and claims the priority of China Application No. 201710901828.8, filed on Sep. 28, 2017, the entirety of which is incorporated by reference herein.

FIELD OF THE DISCLOSURE

The disclosure relates to a display technical field, and more particularly to a method for forming a liquid crystal display panel and a liquid crystal display panel.

BACKGROUND

With the development of display technology, liquid crystal display (LCD) and other planar display devices have advantages including high quality, power saving, thin body and wide application. Accordingly, they are widely used in mobile phones, televisions, personal digital assistants, digital cameras, notebook computers, desktop computers and other consumer electronics products, and become the mainstream display devices.

Most of the current liquid crystal display devices are backlight-type liquid crystal display devices. The backlight-type liquid crystal display devices comprise a housing, a liquid crystal panel disposed in the housing, and a backlight module disposed in the housing. In general, a liquid crystal panel is composed of a color filter (CF) substrate, a thin film transistor array substrate (TFT Array Substrate), and a liquid crystal layer sandwiched between the CF substrate and the TFT substrate. The working principle of the liquid crystal panel is applying driving voltage to control rotation directions of liquid crystal molecules of the liquid crystal layer, for controlling the output of light and for refracting light from the backlight module to generate images.

The fabrication process of a liquid crystal display panel generally comprises front-end array processes (including thin film, photolithography, etching and stripping processes), middle-end cell processes (attaching the TFT substrate and the CF substrate), and back-end module assembly processes (laminating driving IC and a printed circuit board). In the fabrication process, the front-end array processes mainly form the TFT substrate so as to control the movement of liquid crystal molecules. The middle-end cell processes mainly add liquid crystal between the TFT substrate and the CF substrate. The back-end module assembly processes mainly laminate the driving IC and integrate the printed circuit board so as to drive the liquid crystal molecules to rotate and display images.

When the conventional liquid crystal display panel is displaying, the voltage on the data line of the array substrate is coupled with the common voltage (CF_com) on the common electrode of the color filter substrate. It would be easy to induce horizontal crosstalk. As a result, the display quality is poor, especially, in a liquid crystal display panel with a tri-gate structure and high resolution. Since the feedthrough of the liquid crystal display panel with the tri-gate structure and high resolution is larger and the charging time is shorter, the horizontal crosstalk problem is more serious.

SUMMARY

An objective of the disclosure is to provide a method for forming a liquid crystal display panel. Therefore, the horizontal crosstalk can be reduced and the display quality can be improved.

Another objective of the disclosure is to provide a liquid crystal display panel. The liquid crystal display panel can have reduced horizontal crosstalk and an improved display quality.

In order to achieve the objectives above, the disclosure provides a method for forming a liquid crystal display panel. The method comprises the following steps:

Step S1, comprising providing a first substrate, and forming a first metal layer and a first insulating layer covering the first metal layer and the first substrate on the first substrate.

Step S2, comprising depositing a second metal film on the first insulating layer, and patterning the second metal film through a mask to obtain a second metal layer.

Step S3, comprising depositing a second insulating layer on the second metal layer and the first insulating layer, and forming a pixel electrode on the second insulating layer.

Step S4, comprising providing a second substrate; depositing a common electrode film on the second substrate, and patterning the common electrode film through the mask of the step S2 to form a common electrode. The common electrode comprises a hollow region formed thereon. The hollow region is the same as the pattern of the second metal layer.

Step S5, comprising assembling the first substrate and the second substrate into a cell, and forming a liquid crystal layer between the first substrate and the second substrate to obtain a liquid crystal display panel.

The first metal layer comprises a gate electrode and a scan line electrically connected to the gate electrode.

The second metal layer comprises a source electrode, a data line electrically connected to the source electrode, and a drain electrode electrically connected to the pixel electrode.

The step S1 further comprises forming a gate insulating layer between the first metal layer and the first insulating layer, and forming a semiconductor layer between the gate insulating layer and the first insulating layer.

The step S4 further comprises forming a black matrix between the second substrate and the common electrode, and forming a spacer on the common electrode.

The patterning of the second metal film through the mask of the step S2 comprises:

coating a first photoresist on the second metal film, and exposing and developing the first photoresist through the mask, etching the second metal film with the first photoresist as masking, and removing the first photoresist to obtain the second metal layer.

The patterning of the common electrode film through the mask of the step S2 in the step S4 comprises:

coating a second photoresist on the common electrode film, and exposing and developing the second photoresist through the mask, etching the common electrode film with the second photoresist as masking, and removing the second photoresist to obtain the common electrode.

The first photoresist is one of a positive photoresist and a negative photoresist, and wherein the second photoresist is another of the positive photoresist and the negative photoresist that is different from the first photoresist.

The disclosure also provides a liquid crystal display panel. The liquid crystal display panel comprises a first substrate and a second substrate disposed opposite to each other, a first metal layer formed on a side of the first substrate close to the second substrate, a first insulating layer covering the first metal layer and the first substrate, a patterned second metal layer formed on the first insulating layer, a second insulating layer covering the patterned second metal layer and the first insulating layer, a pixel electrode formed on the second insulating layer, a common electrode formed on a side of the second substrate close to the first substrate, and a liquid crystal layer formed between the pixel electrode and the common electrode. The common electrode comprises a hollow region formed thereon. The hollow region is the same as the pattern of the second metal layer.

The first metal layer comprises a gate electrode and a scan line electrically connected to the gate electrode. The second metal layer comprises a source electrode, a data line electrically connected to the source electrode, and a drain electrode electrically connected to the pixel electrode.

The liquid crystal display panel further comprises a gate insulating layer formed between the first metal layer and the first insulating layer, a semiconductor layer formed between the gate insulating layer and the first insulating layer, a black matrix formed between the second substrate and the common electrode, and a spacer formed on the common electrode.

The disclosure further provides a method for forming a liquid crystal display panel. The method comprises the following steps:

Step S1, comprising providing a first substrate, and forming a first metal layer and a first insulating layer covering the first metal layer and the first substrate on the first substrate.

Step S2, comprising depositing a second metal film on the first insulating layer, and patterning the second metal film through a mask to obtain a second metal layer.

Step S3, comprising depositing a second insulating layer on the second metal layer and the first insulating layer, and forming a pixel electrode on the second insulating layer.

Step S4, comprising providing a second substrate, depositing a common electrode film on the second substrate, and patterning the common electrode film through the mask of the step S2 to form a common electrode. The common electrode comprises a hollow region formed thereon. The hollow region is the same as the pattern of the second metal layer.

Step S5, comprising assembling the first substrate and the second substrate into a cell, and forming a liquid crystal layer between the first substrate and the second substrate to obtain a liquid crystal display panel.

Wherein the first metal layer comprises a gate electrode and a scan line electrically connected to the gate electrode.

Wherein the second metal layer comprises a source electrode, a data line electrically connected to the source electrode, and a drain electrode electrically connected to the pixel electrode.

Wherein the step S1 further comprises forming a gate insulating layer between the first metal layer and the first insulating layer, and forming a semiconductor layer between the gate insulating layer and the first insulating layer.

Wherein the step S4 further comprises forming a black matrix between the second substrate and the common electrode, and forming a spacer on the common electrode.

The beneficial effects of the disclosure are as follows:

The disclosure provides a method for forming a liquid crystal display panel. The method comprises using a mask for the patterning of the second metal layer and using the mask to pattern the common electrode on the second substrate. As a result, the common electrode comprises a hollow region formed thereon. The hollow region is the same as the pattern of the second metal layer. Therefore, the capacitance between the second metal layer and the common electrode can be reduced. The problem of horizontal crosstalk is mitigated. The display quality of the liquid crystal display panel is enhanced. The disclosure also provides a liquid crystal display panel. The liquid crystal display panel can have reduced horizontal crosstalk and an improved display quality.

BRIEF DESCRIPTION OF THE DRAWINGS

In order to further understand the features and technical contents of the disclosure, the detailed descriptions and the accompanying drawings of the disclosure are provided as follows. However, the drawings are only for reference and illustration, and are not intended to limit the disclosure.

In the drawings.

DETAILED DESCRIPTION OF PREFERRED EMBODIMENTS

In order to further illustrate the technical means and their effects of the disclosure, the preferred embodiments of the disclosure will be described in detail with reference to accompanying drawings as follows.

Figure 1:
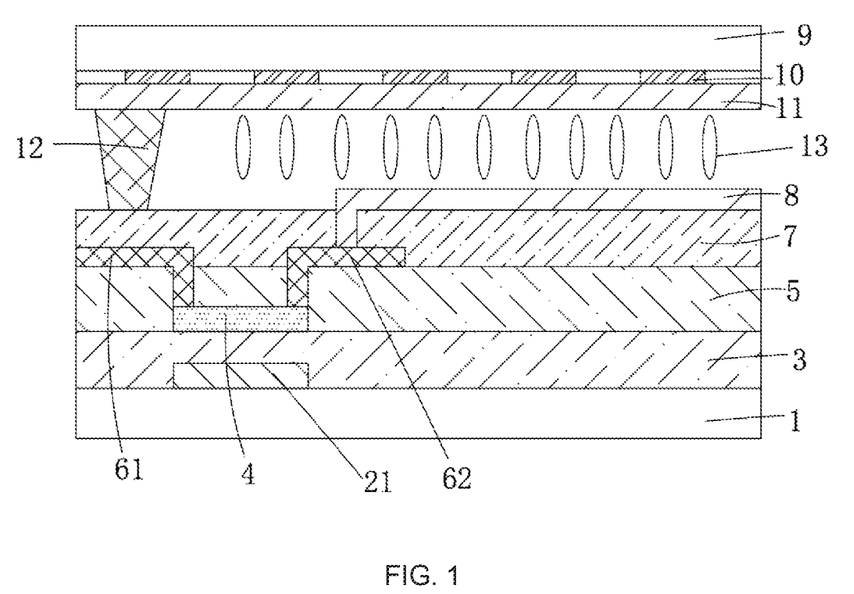
FIG. 1 is a cross-sectional view of a liquid crystal display panel of the disclosure.
Figure 2:
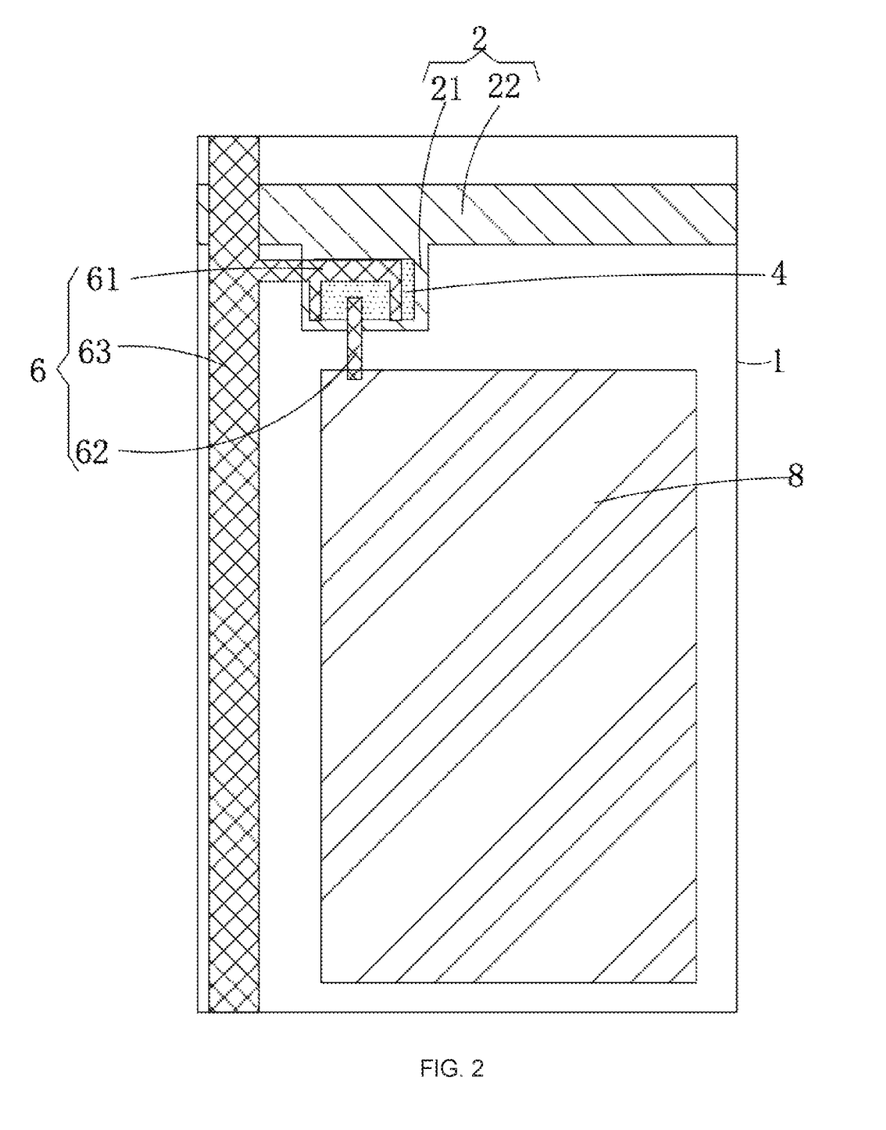
FIG. 2 is a top view of a first substrate of a liquid crystal display panel of the disclosure.
Figure 4:
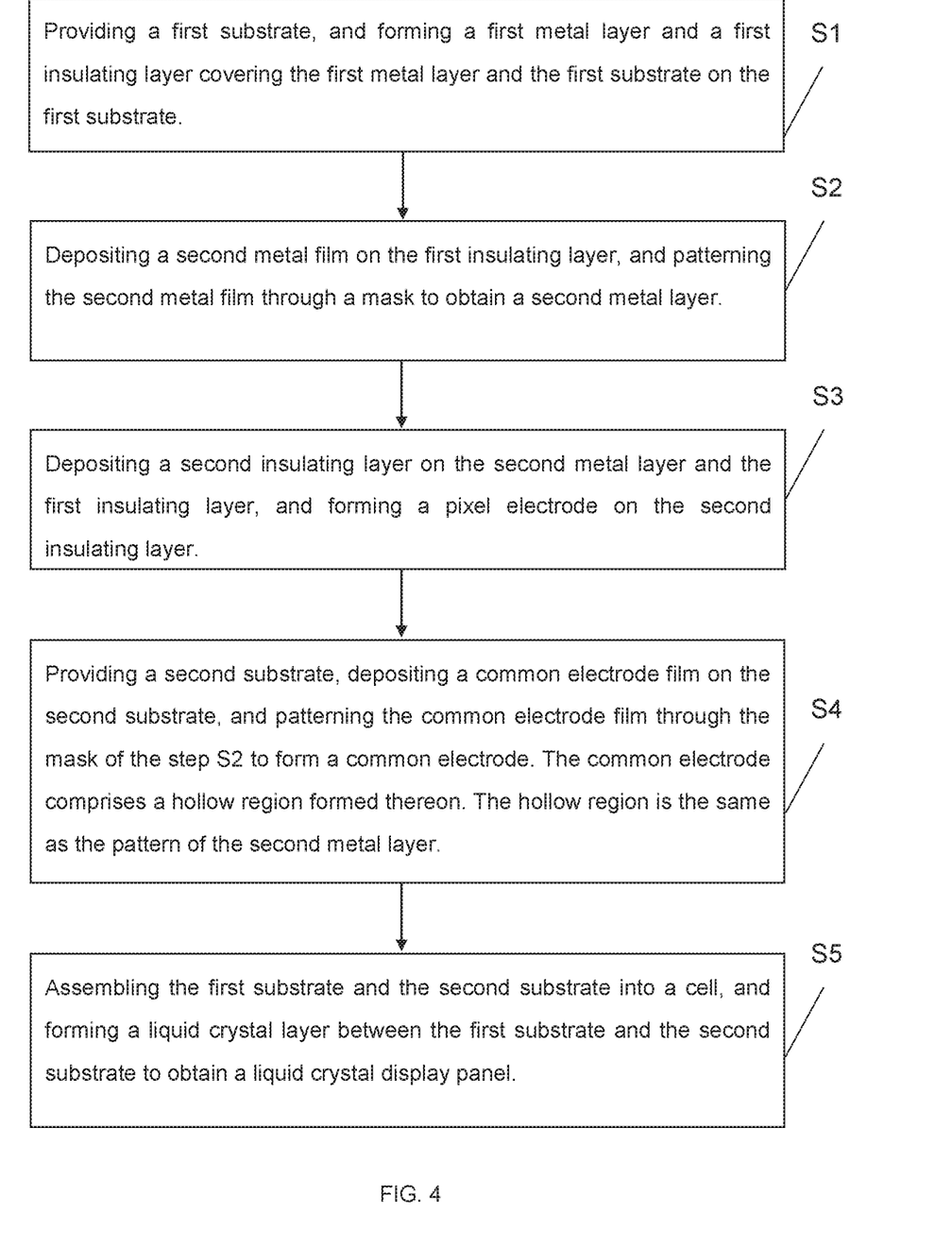
FIG. 4 is a flowchart of a method for forming a liquid crystal display panel of the disclosure.

Referring to FIG. 4, the disclosure provides a method for forming a liquid crystal display panel, comprising the following steps:

Step S1: referring to FIG. 1 and FIG. 2, a first substrate 1 is provided. A first metal layer 2 and a first insulating layer 5 covering the first metal layer 2 and the first substrate 1 are formed on the first substrate 1.

Specifically, the first metal layer 2 comprises a gate electrode 21 and a scan line 22 electrically connected to the gate electrode 21. The scan line 22 extends in a horizontal direction.

Furthermore, the step S1 further comprises forming a gate insulating layer 3 between the first metal layer 2 and the first insulating layer 5, forming a semiconductor layer 4 between the gate insulating layer 3 and the first insulating layer 5, and forming two first through-holes in the first insulating layer 5. The two first through-holes expose two ends of the semiconductor layer 4. The semiconductor layer 4 is formed directly above the gate electrode 21. The semiconductor layer 4 may be a metal oxide semiconductor, an amorphous silicon semiconductor, or a polysilicon semiconductor.

Preferably, the material of the first metal layer 2 is one or more of molybdenum, aluminum, copper, and titanium. Preferably, the materials of the gate insulating layer 3 and the first insulating layer 5 are both silicon oxide, silicon nitride, or a combination of silicon oxide and silicon nitride.

Step S2: depositing a second metal film on the first insulating layer 5, and patterning the second metal film through a mask to obtain a second metal layer 6.

Specifically, the step S2 comprises:

coating a first photoresist on the second metal film, and exposing and developing the first photoresist through the mask, etching the second metal film with the first photoresist as masking, and removing the first photoresist to obtain the second metal layer 6.

Furthermore, the second metal layer 6 comprises a source electrode 61, a data line 63 electrically connected to the source electrode 61, and a drain electrode 62 electrically connected to a pixel electrode 8. The source electrode 61 and the drain electrode 62 are respectively in contact with two ends of the semiconductor layer 4 through two first through-holes penetrating the first insulating layer 5.

Step S3: depositing a second insulating layer 7 on the second metal layer 6 and the first insulating layer 5, and forming the pixel electrode 8 on the second insulating layer 7.

Specifically, the step S3 further comprises forming a second through-hole in the second insulation layer 7 to penetrate the second insulation layer 7. The second through-hole exposes the drain electrode 62. The pixel electrode 8 is in contact with the drain electrode 62 through the second through-hole.

Preferably, the material of the pixel electrode 8 is indium tin oxide (ITO).

Figure 3:
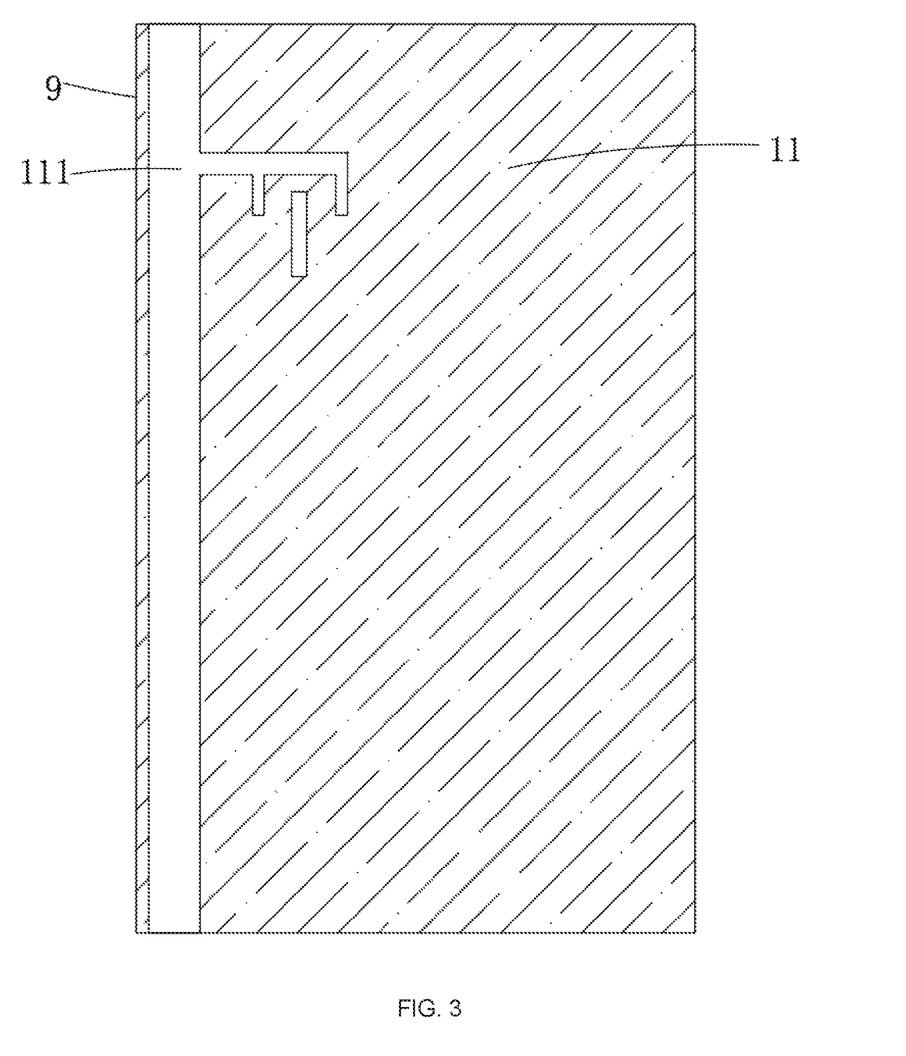
FIG. 3 is a top view of a second substrate of a liquid crystal display panel of the disclosure.

Step S4: referring to FIG. 1 and FIG. 3, a second substrate 9 is provided. A common electrode film is deposited on the second substrate 9. The common electrode film is patterned through the mask of the step S2 to form a common electrode 11. The common electrode 11 comprises a hollow region 111 formed thereon. The hollow region 111 is the same as the pattern of the second metal layer 6.

Specifically, a second photoresist is coated on the common electrode film. The second photoresist is exposed and developed through the mask. The common electrode film is etched with the second photoresist as masking. The second photoresist is removed to obtain the common electrode 11.

The first photoresist is one of a positive photoresist and a negative photoresist. The second photoresist is another of the positive photoresist and the negative photoresist that is different from the first photoresist.

Furthermore, the first photoresist and the second photoresist have different positive and negative qualities. As a result, in the step S4, when the patterning process is performed using the same mask as that of the step S2, the hollow region 111 having the same pattern as that of the second metal layer 6 can be formed on the common electrode 11. The capacitance between the common electrode 11 and the second metal layer 6 is reduced.

In detail, according to the voltage variation formula for the common electrode 11:

$$\Delta U = \Delta V \ast Cdc/C\text{total}$$

Where ΔV is the voltage variation on the second metal layer 6. Cdc is the capacitance between the second metal layer 6 and the common electrode 11. Ctotal is the total capacitance of the common electrode 11. According to the voltage variation formula, it can be realized that the smaller the capacitance between the second metal layer 6 and the common electrode 11 is, the less the influence on the voltage on the common electrode 11 is. Therefore, in the disclosure, by reducing the capacitance between the common electrode 11 and the second metal layer 6, the voltage variation on the second metal layer 6 has a reduced impact on the voltage on the common electrode 11. The horizontal crosstalk is reduced. The display quality is improved.

Specifically, the hollow region 111 is correspondingly located above the data line 63, the source electrode 61, and the drain electrode 62.

Furthermore, the step S4 further comprises forming a black matrix 10 between the second substrate 9 and the common electrode 11, and forming a spacer 12 on the common electrode 11.

Furthermore, a color resist layer (not shown) may be disposed between the second substrate 9 and the common electrode 11. The black matrix 10 separates the color resist layer. It would be understood that the color resist layer may also be disposed on the first substrate 1. That is, the liquid crystal display panel is a liquid crystal display panel using color-filter on array (COA) technology. This is not a limitation of the disclosure.

Step S5: assembling the first substrate 1 and the second substrate 9 into a cell, and forming a liquid crystal layer 13 between the first substrate 1 and the second substrate 9 to obtain a liquid crystal display panel.

Referring to FIG. 1 to FIG. 3, the disclosure also provides a liquid crystal display panel. The liquid crystal display panel comprises a first substrate 1 and a second substrate 9 disposed opposite to each other. A first metal layer 2 is formed on a side of the first substrate 1 close to the second substrate 9. A first insulating layer 5 covers the first metal layer 2 and the first substrate 1. A patterned second metal layer 6 is formed on the first insulating layer 5. A second insulating layer 7 covers the pattered second metal layer 6 and the first insulating layer 5. A pixel electrode 8 is formed on the second insulating layer 7. A common electrode 11 is formed on a side of the second substrate 9 close to the first substrate 1. A liquid crystal layer 13 is formed between the pixel electrode 8 and the common electrode 11. The common electrode 11 comprises a hollow region 111 formed thereon. The hollow region 111 is the same as the pattern of the second metal layer 6.

Specifically, the first metal layer 2 comprises a gate electrode 21 and a scan line 22 electrically connected to the gate electrode 21. The second metal layer 6 comprises a source electrode 61, a data line 63 electrically connected to the source electrode 61, and a drain electrode 62 electrically connected to the pixel electrode 8.

Furthermore, the liquid crystal display panel further comprises a gate insulating layer 3 formed between the first metal layer 2 and the first insulating layer 5. A semiconductor layer 4 is formed between the gate insulating layer 3 and the first insulating layer 5. A black matrix 10 is formed between the second substrate 9 and the common electrode 11. A spacer 12 is formed on the common electrode 11.

In detail, according to the voltage variation formula for the common electrode 11:

$$\Delta U = \Delta V \ast Cdc/C\text{total}$$

Where ΔV is the voltage variation on the second metal layer 6. Cdc is the capacitance between the second metal layer 6 and the common electrode 11. Ctotal is the total capacitance of the common electrode 11. According to the voltage variation formula, it can be realized that the smaller the capacitance between the second metal layer 6 and the common electrode 11 is, the less the influence on the voltage on the common electrode 11 is. Therefore, in the liquid crystal display panel of the disclosure, by forming the hollow region 111 on the common electrode 11, the capacitance between the common electrode 11 and the second metal layer 6 can be reduced. As a result, the voltage variation on the second metal layer 6 has a reduced impact on the voltage on the common electrode 11. The horizontal crosstalk is reduced. The display quality is enhanced.

In summary, the disclosure provides a method for forming a liquid crystal display panel. The method comprises using a mask for the patterning of the second metal layer and using the mask to pattern the common electrode on the second substrate. As a result, the common electrode comprises a hollow region formed thereon. The hollow region is the same as the pattern of the second metal layer. Therefore, the capacitance between the second metal layer and the common electrode can be reduced. The problem of horizontal crosstalk is mitigated. The display quality of the liquid crystal display panel is enhanced. The disclosure also provides a liquid crystal display panel. The liquid crystal display panel can have reduced horizontal crosstalk and an enhanced display quality.

In the foregoing, other corresponding modifications and variations may be made by those skilled in the art according to the technical solutions and technical ideas of the disclosure. All such modifications and variations should be included in the protection scope of the application.

What is claimed is:

1. A method for forming a liquid crystal display panel, comprising:
    a step S1, comprising:
        providing a first substrate; and
        forming a first metal layer and a first insulating layer covering the first metal layer and the first substrate on the first substrate;
    a step S2, comprising:
        depositing a second metal film on the first insulating layer; and
        patterning the second metal film through a mask to obtain a second metal layer;
    a step S3, comprising:
        depositing a second insulating layer on the second metal layer and the first insulating layer; and
        forming a pixel electrode on the second insulating layer;
    a step S4, comprising:
        providing a second substrate;
        depositing a common electrode film on the second substrate; and
        patterning the common electrode film through the mask of the step S2 to form a common electrode, wherein the common electrode comprises a hollow region formed thereon, and the hollow region is the same as a pattern of the second metal layer; and
    a step S5, comprising:
        assembling the first substrate and the second substrate into a cell; and
        forming a liquid crystal layer between the first substrate and the second substrate to obtain a liquid crystal display panel.

2. The method for forming a liquid crystal display panel as claimed in claim 1, wherein the first metal layer comprises a gate electrode and a scan line electrically connected to the gate electrode.

3. The method for forming a liquid crystal display panel as claimed in claim 1, wherein the second metal layer comprises a source electrode, a data line electrically connected to the source electrode, and a drain electrode electrically connected to the pixel electrode.

4. The method for forming a liquid crystal display panel as claimed in claim 1, wherein the step S1 further comprises:
    forming a gate insulating layer between the first metal layer and the first insulating layer; and
    forming a semiconductor layer between the gate insulating layer and the first insulating layer.

5. The method for forming a liquid crystal display panel as claimed in claim 1, wherein the step S4 further comprises:
    forming a black matrix between the second substrate and the common electrode; and
    forming a spacer on the common electrode.

6. The method for forming a liquid crystal display panel as claimed in claim 1, wherein the patterning of the second metal film through the mask of the step S2 comprises:
    coating a first photoresist on the second metal film;
    exposing and developing the first photoresist through the mask;
    etching the second metal film with the first photoresist as masking; and
    removing the first photoresist to obtain the second metal layer.

7. The method for forming a liquid crystal display panel as claimed in claim 6, wherein the patterning of the common electrode film through the mask of the step S2 in the step S4 comprises:
    coating a second photoresist on the common electrode film;
    exposing and developing the second photoresist through the mask;
    etching the common electrode film with the second photoresist as masking; and
    removing the second photoresist to obtain the common electrode,
    wherein the first photoresist is one of a positive photoresist and a negative photoresist, and wherein the second photoresist is another of the positive photoresist and the negative photoresist that is different from the first photoresist.

8. A method for forming a liquid crystal display panel, comprising:
    a step S1, comprising:
        providing a first substrate; and
        forming a first metal layer and a first insulating layer covering the first metal layer and the first substrate on the first substrate;
    a step S2, comprising:
        depositing a second metal film on the first insulating layer; and
        patterning the second metal film through a mask to obtain a second metal layer;
    a step S3, comprising:
        depositing a second insulating layer on the second metal layer and the first insulating layer; and
        forming a pixel electrode on the second insulating layer;
    a step S4, comprising:
        providing a second substrate;
        depositing a common electrode film on the second substrate; and
        patterning the common electrode film through the mask of the step S2 to form a common electrode, wherein the common electrode comprises a hollow region formed thereon, and the hollow region is the same as a pattern of the second metal layer; and
    a step S5, comprising:
        assembling the first substrate and the second substrate into a cell; and
        forming a liquid crystal layer between the first substrate and the second substrate to obtain a liquid crystal display panel,
    wherein the first metal layer comprises a gate electrode and a scan line electrically connected to the gate electrode, wherein the second metal layer comprises a source electrode, a data line electrically connected to the source electrode, and a drain electrode electrically connected to the pixel electrode, wherein the step S1 further comprises:

forming a gate insulating layer between the first metal layer and the first insulating layer; and forming a semiconductor layer between the gate insulating layer and the first insulating layer, wherein the step S4 further comprises:

forming a black matrix between the second substrate and the common electrode; and forming a spacer on the common electrode.

9. The method for fabricating a liquid crystal display panel according to claim 8, wherein the patterning of the second metal film through the mask of the step S2 comprises:

coating a first photoresist on the second metal film;

exposing and developing the first photoresist through the mask;

etching the second metal film with the first photoresist as masking; and removing the first photoresist to obtain the second metal layer.

10. The method for fabricating a liquid crystal display panel according to claim 9, wherein the patterning of the common electrode film through the mask of the step S2 in the step S4 comprises:

coating a second photoresist on the common electrode film;

exposing and developing the second photoresist through the mask;

etching the common electrode film with the second photoresist as masking; and removing the second photoresist to obtain the common electrode, wherein the first photoresist is one of a positive photoresist and a negative photoresist, and wherein the second photoresist is another of the positive photoresist and the negative photoresist that is different from the first photoresist.

* * * * *